(12) United States Patent
Farnia et al.

(10) Patent No.: US 7,285,893 B2
(45) Date of Patent: Oct. 23, 2007

(54) MAGNETIC POWDER METAL COMPONENT STATOR

(75) Inventors: David Farnia, Elburn, IL (US); John Engquist, Saint Charles, IL (US)

(73) Assignee: Burgess-Norton Mfg. Co., Inc., Geneva, IL (US)

(*) Notice: Subject to any disclaimer, the term of this patent is extended or adjusted under 35 U.S.C. 154(b) by 36 days.

(21) Appl. No.: 11/378,408

(22) Filed: Mar. 20, 2006

(65) Prior Publication Data

US 2007/0216254 A1 Sep. 20, 2007

(51) Int. Cl.
*H02K 1/18* (2006.01)

(52) U.S. Cl. ........................ 310/218; 310/259
(58) Field of Classification Search .............. 310/218, 310/259, 216, 254, 260, 54
See application file for complete search history.

(56) References Cited

U.S. PATENT DOCUMENTS

| | | | | |
|---|---|---|---|---|
| 6,472,792 B1* | 10/2002 | Jack et al. | .................. | 310/254 |
| 6,992,418 B2* | 1/2006 | Hans | .......................... | 310/216 |
| 2003/0006663 A1* | 1/2003 | Hsu | .......................... | 310/194 |
| 2006/0071569 A1* | 4/2006 | Stewart et al. | .............. | 310/194 |

* cited by examiner

*Primary Examiner*—Darren Schuberg
*Assistant Examiner*—Hong-Vinh Nguyen
(74) *Attorney, Agent, or Firm*—Edward J. Brosius

(57) ABSTRACT

A compacted magnetic powder metal component stator for use in an electrical machine is provided. Each stator is comprised of a plurality of stator core assemblies. Each stator core assembly forms an arcuate section of the stator core itself. Each stator core assembly is comprised of an inner shoe component, with winding guides supporting a winding, and at least one back piece and two end caps fitted to the winding on the outer radial edge of the stator assembly.

19 Claims, 2 Drawing Sheets

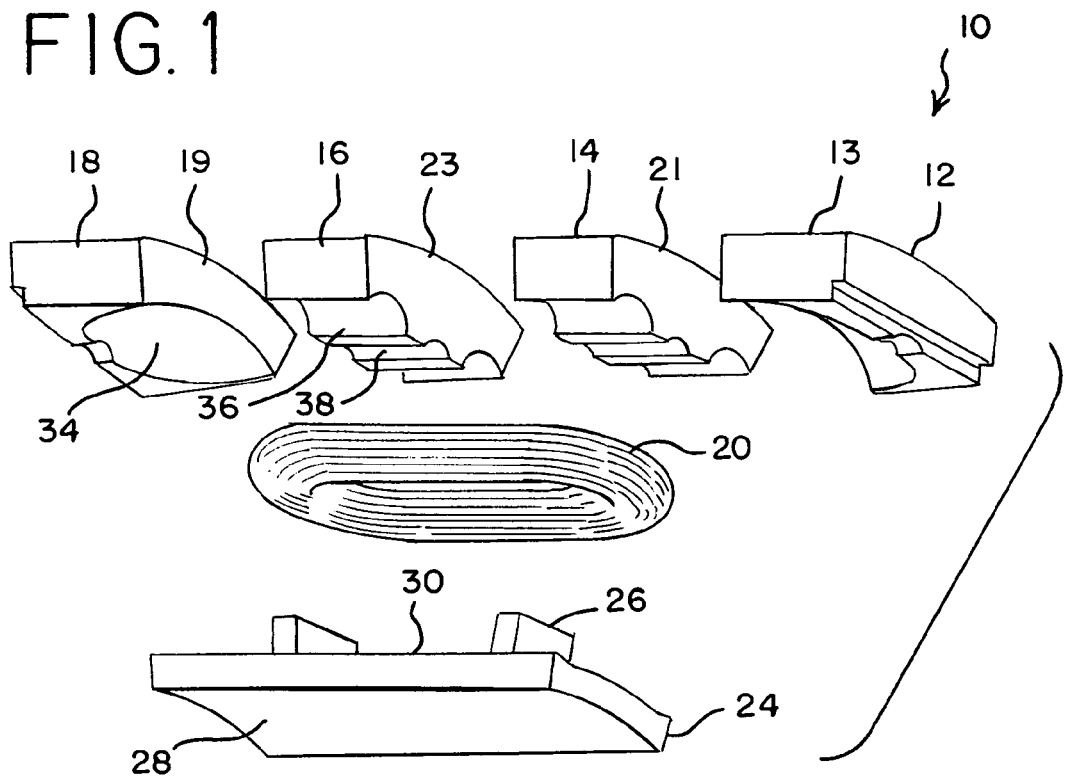
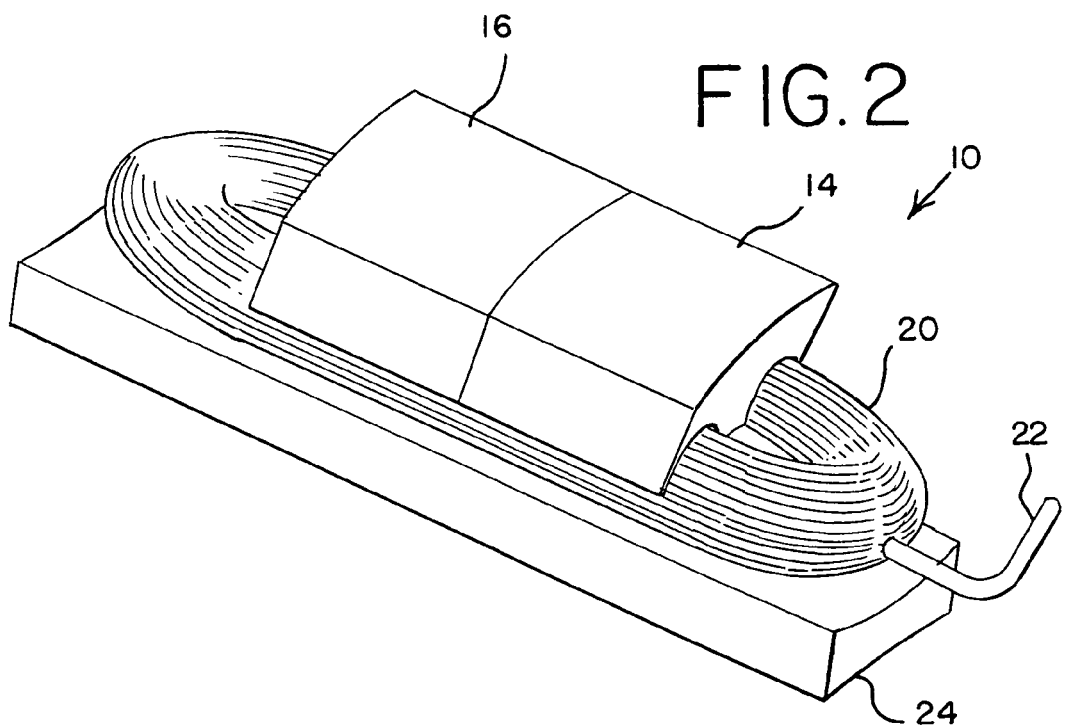

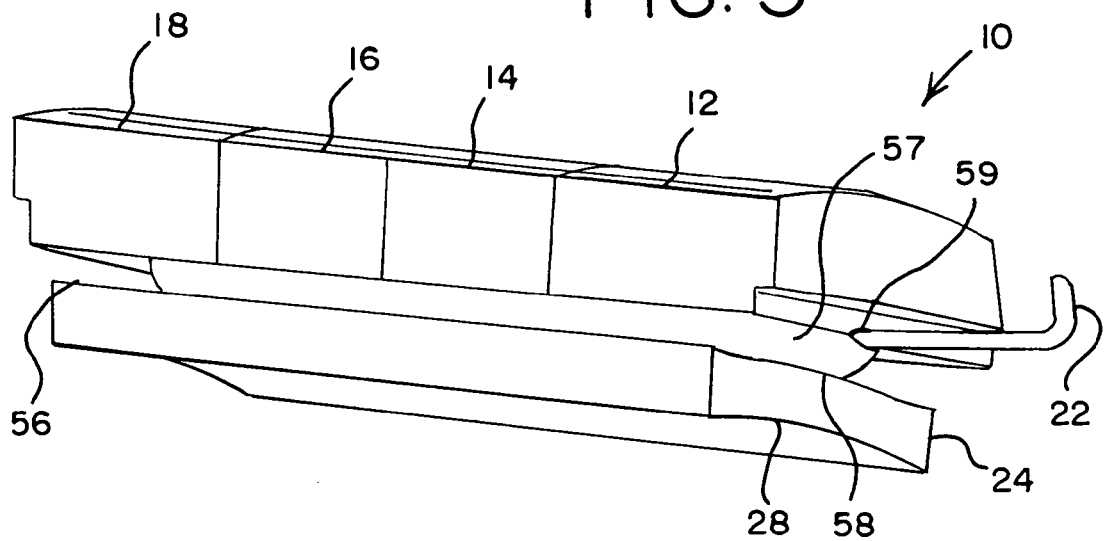
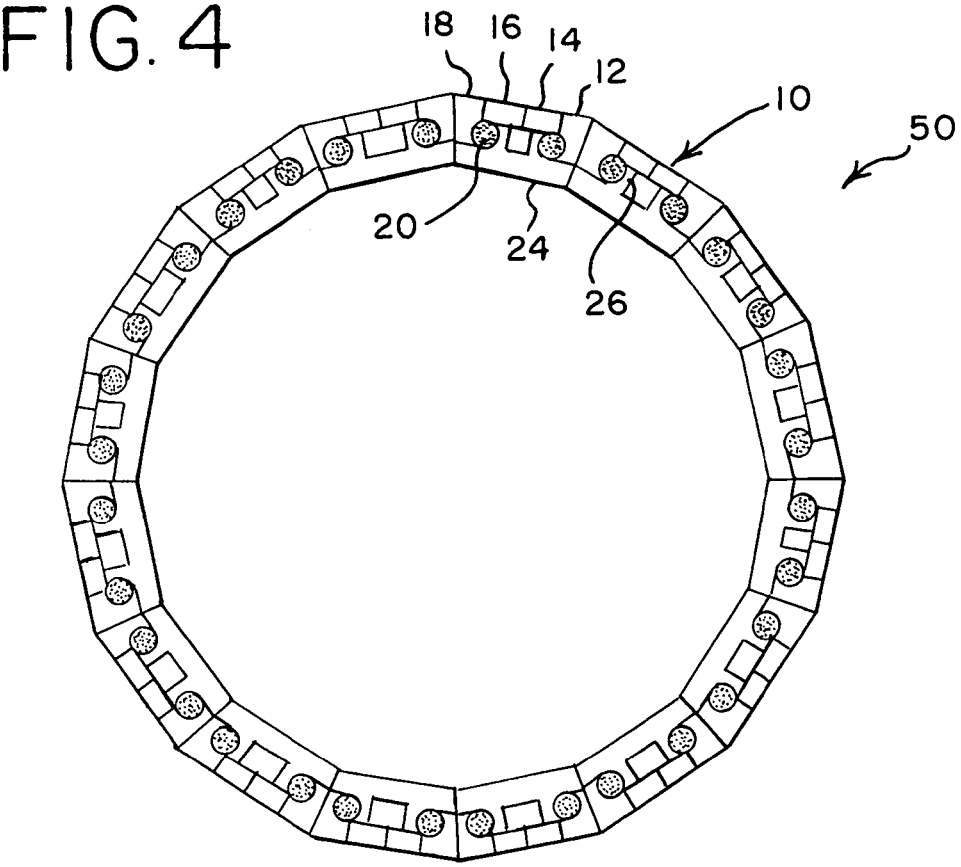

MAGNETIC POWDER METAL COMPONENT STATOR

BACKGROUND OF THE INVENTION

The present invention relates to core components for use in electrical machines and, more particularly, a stator assembly for use in an electrical machine, most typically an electric motor.

Electrical machines such as motors and generators have a stationary element, usually termed a stator, and movable or rotating elements, typically termed the rotor. The interaction between the stator and the rotor is caused by the interaction of a magnetic field generated by either the stator or the rotor. Such magnetic field is usually generated or induced by electric currents in a winding placed on either the stator or the rotor. Such winding usually comprises a plurality of coils wound about a winding support. The winding support is usually comprised of a soft magnetic material which traditionally is made of laminations of selected steel materials. The laminations are insulated from each other in order to reduce eddy currents.

One concern in the design of such electrical machines is the need or desire to reduce the free space by improving the fill factor of the windings. It is desirable that the windings fill as much of the open space as practical to improve the inter action between the electromagnetic field between the stator and the rotor. This produces a more efficient motor or generator. Such terminology is deemed as the power density of the motor.

It has become known also to replace the laminated steel materials of the stator or rotor cores with ferro-magnetic powder particles that are compacted in a powder metallurgy operation to form the winding support. The ferro-magnetic powder particles themselves are electrically insulated from each other so that the resulting compacted product exhibits a low eddy current loss in a manner similar to the use of stacks of laminated steel materials. Such use of compacted metal powders comprised of ferro-magnetic powder particles for cores in electrical machines is disclosed in U.S. Pat. Nos. 6,956,307, 6,300,702 and 6,441,530.

Accordingly, it is an object of the present invention to provide an improved stator assembly for use in an electrical machine wherein the fill factor of the windings is reduced and accordingly, the power density of the motor itself is improved.

It is another object of the present invention to provide an improved stator assembly for use in electrical machines wherein the stator assembly utilizes components comprised of compacted ferrous-magnetic powder.

SUMMARY OF THE INVENTION

The present invention provides an improved stator assembly for an electrical machine and, more specifically, an improved stator assembly for use in an electrical motor or generator. The improved stator assembly comprises a plurality of components. Each stator assembly forms an arcuate section of the stator itself, which is understood to be generally cylindrical structure. Each stator assembly comprises an inner shoe, a winding assembly, a back piece, and two end caps. Each stator assembly is adjacent another similar stator assembly along a circumferential plane of the stator itself.

Further, each of the inner shoe component, back piece, and end cap are formed of ferrous magnetic powder particles. Such ferrous magnetic powder particles are mutually insulated. The ferrous magnetic metal powder particles are pressure formed in a powder metal operation into a solid form.

It is a feature of the present invention that such an improved stator assembly comprised of a plurality of sections formed of mutually insulated ferrous magnetic powder metal particles provides improved performance due to the reduced eddy current losses in the electrical machine. Such improved performance is mainly due to the elimination of open spaces by improving the fill factor of the windings within the stator assembly. Such improved filling of open spaces within the stator assembly also improves the power density of the motor.

BRIEF DESCRIPTION OF THE DRAWINGS

In the drawings,

FIG. 1 is a perspective view, with individual components shown separated, of a stator assembly is accordance with an embodiment of the present invention;

FIG. 2 is a perspective view of a stator assembly in accordance with an embodiment of the present invention;

FIG. 3 is a perspective view of a stator assembly with a bonding agent encapsulating the stator assembly components, and FIG. 4 is a cross sectional view of a stator comprised of a plurality of stator assemblies in accordance with an embodiment of the present invention.

DESCRIPTION OF THE PREFERRED EMBODIMENTS

Referring now to FIG. 1 of the drawings, a stator assembly is shown generally at 10. Stator assembly 10 is seen to be generally comprised of an inner shoe component 24 which is generally rectangular in shape, having an inwardly arcuate inner surface 28 and an outwardly arcuate outer surface 30. Another way of viewing inner shoe component 24 is to say that inner surface 28 is concave along a longitudinal axis of inner component 24 and outer surface 30 is convex along a longitudinal axis of inner shoe component 24. Winding guides 26 are seen to be raised and extending from outer surface 30 of inner shoe component 24. Each winding guide 26 is seen to have an arcuate or circular section outer surface and a generally straight inner surface.

Winding 20 is seen to be generally oval in shape, and is comprised of numerous windings of insulated electrical wire. A winding lead 22 extends outwardly from winding 20 to allow and appropriate electrical connection in the final configuration of stator assembly 10. Winding 20 is seen to fit about guides 26 in order to allow the close spacing of inner shoe component 24 adjacent winding 20.

End caps 12 and 18 are seen to be identical, with an outer surface 13 for end cap 12 and 19 for end cap 18, which is outwardly arcuate, or generally convex along a longitudinal axis of stator assembly 10. Further, end cap 18 is seen to have a cut out 34 that is formed to fit about an end of winding 20. Accordingly, end cap 18 is seen to provide a snug fit, as is end cap 12, about the ends of winding 20. Further, end caps 12 and 18 are seen to be in close proximity to the outer surface 30 of inner shoe component 24.

Back pieces 14 and 16 are identical, and are seen to be adjacent each other and located inwardly and adjacent to end caps 12 and 18. Each back piece 14 and 16 is seen to have an outwardly arcuate outer surface 21 for back piece 14 and 23 for back piece 16. Further, back piece 16 is shown to have a cut out section 36 located near a lateral edge of back piece 16 and another cut out section adjacent the other lateral edge of back piece 16. Back piece 14 has similar cut out sections. Cut out section 36 and the similar cut out section adjacent the other lateral edge of back piece 16 are preferably arcuate in form to adapt as closely as possible to the top surface of winding 20. However, if for some reason winding 20 were to take an other than arcuate shape, then cut out openings 36 and the other cut out opening in back piece 16 would be similarly complementary to the shape of the top of winding 20.

Further, back piece 16 is also seen to have inner support 38 that extend adjacent cut out section 36 and, with a similar inner support adjacent the other cut out section in back piece 16. Such inner support acts to form part of cut out 36 as well as assure the physical location of a portion of back piece 16 as near as possible to outer surface 30 of inner shoe component 24.

It should be understood that end caps 12 and 18, back pieces 14 and 16, and inner shoe component 24 are all comprised of a compacted ferrous magnetic powder comprised of insulated powder particles formed to the shape of the particular component of stator assembly 10. Such forming is done in known powder metal operations, which include die compacting and heat treating. It is important such that the ferrous magnetic metal powder particles used to form the components of stator assembly 10 are insulated electrically from each other so as to diminish the build up of eddy currents within the fully assembled stator.

It should also be understood that appropriate insulating material such as an oxide layer can be utilized between adjacent surfaces of end cap 12, back piece 14, back piece 16 and end cap 18.

Further, each of end pieces 12 and 18 are seen to include mating surface 52 which can be a ledge or similar ridge or depression in the lateral face of end cap 18 adjacent back piece 16. Back piece 16 would include a complementary edge surface to assure a complementary fitting between back piece 16 and end cap 18. End cap 12 and back piece 14 would have similar complementary surfaces.

Referring now to FIG. 2, the stator assembly 10 is shown with inner shoe component 24, winding 20, and back pieces 14 and 16 fitted thereon. It is readily apparent that there is a virtual elimination of any open spaces between back pieces 14 and 16 and inner shoe component 24. Winding 20 is seen to be occupying virtually the entire space between back pieces 14 and 16 and inner shoe component 24. This assures a high fill factor and an improved power density of the motor into which stator assembly 10 would be used.

Referring now to FIG. 3, a fully assembled stator assembly 10 is shown. Stator assembly 10 is seen to comprise inner shoe component 24, with winding 20 placed thereon fitted about winding guides 26, which are not seen in this view. Stator assembly 10 also comprises end cap 12, back piece 14, back piece 16 and end cap 18, all of which are fitted about and onto winding 20 as described above. A bonding agent or resin, at 56 and 58 to encapsulize stator assembly 10 and to ensure the thermal management and strength of the unit of components. Such resin is also provided between end cap 12, back piece 14, back piece 16 and end cap 18 to further assure the bonding and encapsulation of these components. Further, a channel 57 is seen to exist between end cap 12 and inner shoe component 24 to further allow the impregnation and movement of the bonding agent therein. A similar channel 59 provides a similar channel for allowing the bonding agent and resin to further secure and provide good thermal management and strength to stator assembly 10.

Referring now to FIG. 4, an assembled complete stator is shown generally at 50. Such stator is seen to comprise a plurality of stator assemblies 10 which are formed in a circular arrangement, which is typical for a motor or generator. Each stator assembly 10, as described above in FIG. 1-3, is seen to be comprised of an inner shoe component 24, which faces inwardly toward the axis of stator 50. Winding 20 is seen to be placed radially outwardly on inner shoe component 24. Although not shown in this view, it is understood that winding 20 is fitted about winding guides 26 which protrude from outer surface 30 of inner shoe component 24. Further, each stator assembly 10 is seen, as described above in FIGS. 1-3, to be further comprised of end cap 12, adjacent back piece14, adjacent back piece 16, and end cap 18. It is seen that end caps themselves are adjacent each other in the final assembly of the complete stator 50.

What is claimed is:

1. A stator assembly for use in an electrical machine, the stator assembly comprising an inner shoe component having a generally rectangular configuration,
and having a generally concave inner surface along a longitudinal axis of the inner shoe component,
and having a generally convex outer surface along the longitudinal axis of the inner shoe component,
and having at least one winding guide protruding from the convex outer surface,
a winding assembly of a generally oval configuration fitted about the winding guides,
at least one back piece having a generally convex outer surface along a longitudinal axis of the back piece,
and an inner surface having two arcuate cut out sections each adapted to be fitted on a portion of the winding assembly,
and two end cap pieces,
each end cap piece having a generally convex outer surface along a longitudinal axis of the end cap piece,
and an inner surface having a cut out section adapted to be fitted on an end portion of the winding assembly,
wherein two winding guides protrude from the convex outer surface of the inner shoe component to provide supports for the winding assembly.

2. The stator assembly of claim 1 wherein each back piece includes an inner support section protruding from the inner surface, the back piece inner support section forming a portion of each of the arcuate cut out sections.

3. The stator assembly of claim 1 wherein the inner shoe component is comprised of ferrous magnetic powder particles formed to shape the inner shoe component.

4. The stator assembly of claim 1 wherein each back piece is comprised of ferrous magnetic metal power particles formed to shape the back piece.

5. The stator assembly of claim 1 wherein each back piece includes an edge surface and each adjacent end cap piece includes a complementary mating surface.

6. The stator assembly of claim 5 wherein a bonding agent is used to hold the back piece to an adjacent end piece.

7. A stator assembly comprising
an inner shoe component having a generally rectangular configuration and having an inwardly arcuate inner surface,
and having an outwardly arcuate outer surface
and having at least one winding guide protruding from the outer surface, a winding assembly fitted about the winding guide, at lease one back piece having an outwardly arcuate outer surface and an inner surface having two cut out sections each adapted to be fitted on a portion of the winding assembly, and two end cap pieces, each end cap piece having an outwardly arcuate outer surface and an inner surface having a cut out section adapted to be fitted on an end portion of the winding assembly, wherein two winding guides protrude from the convex outer surface of the inner shoe component to provide supports for the winding assembly.

8. The stator assembly of claim 7 wherein each back piece includes an inner support section protruding from the inner surface, the back piece inner support section forming a portion of each of the arcuate cut out sections.

9. The stator assembly of claim 7 wherein the inner shoe component is comprised of ferrous magnetic metal powder particles formed to shape the inner shoe component.

10. The stator assembly of claim 7 wherein each back piece is comprised of ferrous magnetic metal powder particles formed to shape the back piece.

11. The stator assembly of claim 7 wherein each back piece includes an edge surface and each adjacent end cap piece includes a complementary waiting surface.

12. The stator assembly of claim 11 wherein a bonding agent is used to hold the back piece to an adjacent end piece.

13. A stator assembly comprising an inner shoe component having a generally rectangular configuration and having an inwardly arcuate inner surface and having an outwardly arcuate outer surface and having at least one winding guide protruding from the outer surface, a winding assembly fitted about the winding guide, at lease one back piece having an outwardly arcuate outer surface and an inner surface having two cut out sections each adapted to be fitted on a portion of the winding assembly, and two end cap pieces, each end cap piece having an outwardly arcuate outer surface and an inner surface having a cut out section adapted to be fitted on an end portion of the winding assembly, wherein the inner shoe component, the back piece and the end cap pieces are comprised of ferrous magnetic metal powder particles formed to shape the inner shoe component, the back piece and the end cap pieces.

14. The stator assembly of claim 13 wherein two winding guides protrude from the outer surface of the inner shoe component to provide supports for the winding assembly.

15. The stator assembly of claim 13 wherein each back piece includes an inner support section protruding from the inner support section forming a portion of each of the cut out sections.

16. The stator assembly of claim 13 wherein each back piece includes an edge surface and each adjacent end cap piece includes a complementary mating surface.

17. The stator assembly of claim 16 wherein a bonding agent is used to hold the back piece to an adjacent end piece.

18. A stator assembly for use in an electrical machine, the stator assembly comprising an inner shoe component having a generally rectangular configuration, and having a generally concave inner surface along a longitudinal axis of the inner shoe component, and having a generally convex outer surface along the longitudinal axis of the inner shoe component, and having at least one winding guide protruding form the convex outer surface, a winding assembly of a generally oval configuration fitted about the winding guides at least one back piece having a generally convex outer surface along a longitudinal axis of the back piece, and an inner surface having two arcuate cut out sections each adapted to be fitted on a portion of the winding assembly, and two end cap pieces, each end cap piece having a generally convex outer surface along a longitudinal axis of the end cap piece, and an inner surface having a cut out section adapted to be fitted on an end portion assembly, wherein each end cap piece is comprised of ferrous magnetic metal powder particles formed to shape the end cap pieces.

19. A stator assembly comprising an inner shoe component having a generally rectangular configuration and having an inwardly arcuate inner surface, and having an outwardly arcuate outer surface and having at least one winding guide protruding from the outer surface, a winding assembly fitted about the winding guide, at least one back piece having an outwardly arcuate outer surface and an inner surface having two cut out sections each adapted to be fitted on a portion of the winding assembly, and two end cap pieces, each end cap piece having an outwardly arcuate outer surface and an inner surface having a cut out section adapted to be fitted on an end portion of the winding assembly, wherein each end cap piece is comprised of ferrous magnetic metal powder particles formed to shape the end cap piece.

* * * * *

UNITED STATES PATENT AND TRADEMARK OFFICE
CERTIFICATE OF CORRECTION

| | |
|---|---|
| PATENT NO. | : 7,285,893 B2 |
| APPLICATION NO. | : 11/378408 |
| DATED | : October 23, 2007 |
| INVENTOR(S) | : David Farnia and John Engquist |

Page 1 of 1

It is certified that error appears in the above-identified patent and that said Letters Patent is hereby corrected as shown below:

In Column 3, line 34, please remove the number "52".

In Column 4, line 53, "power" should be changed to --powder--.

In Column 5, line 28, "waiting" should be changed to --mating--.

Signed and Sealed this

Twenty-ninth Day of April, 2008

JON W. DUDAS
*Director of the United States Patent and Trademark Office*